(12) United States Patent
Sano et al.

(10) Patent No.: US 8,441,236 B2
(45) Date of Patent: May 14, 2013

(54) GRID PLATE FOR LEAD ACID STORAGE BATTERY, PLATE, AND LEAD ACID STORAGE BATTERY PROVIDED WITH SAME PLATE

(75) Inventors: Shinichi Sano, Tokyo (JP); Katsura Mitani, Tokyo (JP); Yoshikazu Hirose, Tokyo (JP); Hiroyuki Wakatabe, Tokyo (JP); Ichiro Shimoura, Tokyo (JP)

(73) Assignee: Shin-Kobe Electric Machinery Co., Ltd., Tokyo (JP)

( * ) Notice: Subject to any disclaimer, the term of this patent is extended or adjusted under 35 U.S.C. 154(b) by 124 days.

(21) Appl. No.: 13/144,698

(22) PCT Filed: Oct. 26, 2009

(86) PCT No.: PCT/JP2009/005633
§ 371 (c)(1),
(2), (4) Date: Jul. 15, 2011

(87) PCT Pub. No.: WO2011/051997
PCT Pub. Date: May 5, 2011

(65) Prior Publication Data
US 2011/0273135 A1  Nov. 10, 2011

(51) Int. Cl.
*H02J 7/04* (2006.01)
*H02J 7/00* (2006.01)
*H01M 10/44* (2006.01)

(52) U.S. Cl.
USPC .................. 320/153; 320/101; 320/134

(58) Field of Classification Search .................. 320/153, 320/101, 128, 132, 134–136, 150, 152
See application file for complete search history.

(56) References Cited

U.S. PATENT DOCUMENTS
2012/0139475 A1 * 6/2012 Evans et al. .................. 320/106

FOREIGN PATENT DOCUMENTS
JP  10-032020    2/1998
JP  2002-165375  6/2002
JP  2002-186087  6/2002
(Continued)

OTHER PUBLICATIONS
Decision to Grant A Patent mailed Jan. 31, 2012, in connection with Japanese Application No. 2011-538106; 3 pages; Japanese Patent Office, Japan.

*Primary Examiner* — Richard V Muralidar
(74) *Attorney, Agent, or Firm* — Antonelli, Terry, Stout & Kraus, LLP.

(57) ABSTRACT

There is provided a method for operating a lead acid storage battery in order to compensate for fluctuations in the amount of power generated by a solar power generation apparatus, a wind power generation apparatus, or another natural energy power generation device, the lead acid storage battery being charged by a power generation device and discharged to a load. The state of charge of the lead acid storage battery is maintained in a range of 30 to 90% where the fully charged state of the lead acid storage battery is 100%; and the lead acid storage battery is charged and discharged while the battery voltage is kept in a specified range of 1.80 to 2.42 V per cell to extend the service life of the battery. A reference temperature of 25° C. is established, and when the ambient temperature has risen above or fallen below the reference temperature, the upper and lower limit values of a specified range are corrected within a range of −4 mV/° C. to −6 mV/° C. per cell according to the amount by which the temperature has increased or decreased so that a corrected voltage range is obtained. The storage battery is charged and discharged while the battery voltage is kept in the corrected voltage range, and the battery is operated.

17 Claims, 6 Drawing Sheets

FOREIGN PATENT DOCUMENTS

| | | |
|---|---|---|
| JP | 2003-229180 | 8/2003 |
| JP | 2004-186087 | 7/2004 |
| JP | 2004-221521 | 8/2004 |
| JP | 2008-72774 | 3/2008 |
| JP | 2008-104284 | 5/2008 |
| JP | 2009-247108 | 10/2009 |

* cited by examiner

FIG. 1A
FIG. 1B
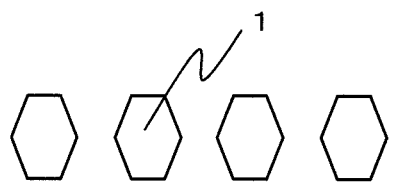
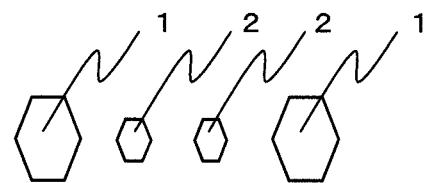

GRID PLATE FOR LEAD ACID STORAGE BATTERY, PLATE, AND LEAD ACID STORAGE BATTERY PROVIDED WITH SAME PLATE

TECHNICAL FIELD OF THE INVENTION

The present invention relates to a method for operating a lead acid storage battery disposed in power generation equipment provided with a solar power generation apparatus, a wind power generation apparatus, or another power generation device that uses natural energy; and relates to a storage device provided with a lead acid storage battery operated in accordance with the operation method.

PRIOR ART OF THE INVENTION

In recent years, reduction of $CO_2$ emissions has come to be viewed as important to protect the earth's environment and prevent global warming. In view of this goal, loads have come to be driven using solar power generation apparatuses, wind power generation apparatuses, or other power generation devices that use natural energy to generate power (hereinbelow referred to as natural energy power generation devices). For example, it is proposed in Japanese Laid-open Patent Application No. 2004-221521 that electric vehicle batteries are charged with power obtained from solar cells.

Natural energy power generation devices are linked to the electric power grid (hereinafter referred to as "transmission grid") of power companies in order to effectively use surplus power generated by a natural energy power generation device.

It is well known that the amount of power generated by a natural energy power generation device fluctuates in an irregular manner and such fluctuation is therefore a considerable drawback to the power quality of the transmission grid when the natural energy power generation device is directly linked to the transmission grid. In the case that the natural energy power generation device is linked to the transmission grid, a power company may not be able to satisfy the required linkage conditions when there is considerable fluctuation in the power supplied from a power generation device.

In view of this situation, in a system that links the natural energy power generation device to the transmission grid, fluctuations in the amount of power generated by the power generation device is compensated and fluctuations in the power supplied from the power generation devices to the transmission grid are suppressed by connecting a secondary battery to the power generation device, charging the secondary battery using the output of the power generation device, and discharging the power from the secondary battery to the transmission grid. Lead acid storage batteries are inexpensive, safe, and highly reliable, and are therefore often used as the secondary battery.

Specifically, AC power generated by a natural energy power generation device is converted to suitable DC power using a converter or the like, a lead acid storage battery is charged with DC power, and the DC power obtained from the lead acid storage battery is converted back to AC power using an inverter to thereby supply stable power to the transmission grid, as disclosed in Japanese Laid-open Patent Application No. 2008-072774.

In this case, the lead acid storage battery is preferably used in a state that the state of charge (the state may be referred to hereinafter as "SO C") is a partial state of charge which is a state that is less than a full charge, so that discharge is carried out from the battery to the transmission grid when the amount of power generated by the natural energy power generation device is reduced, and charging of the battery can be carried out by the power generation device when the amount of power generated by the power generation device is increased.

However, since the amount of power generated by a natural energy power generation device fluctuates in an irregular manner, there is a problem in that a lead acid storage battery may continue a state of over-discharge (e.g., a state in which the SOC is 30% or less) or a state of overcharge (a state in which the SOC exceeds 100%) for a long period of time, and the service life of the lead acid storage battery is dramatically reduced (e.g., about five years) when such states continue unabated.

For example, in the case that the lead acid storage battery is in an overdischarged state for a long period of time, a phenomenon ("sulfation") occurs in which crystal of lead sulfate, a material produced through discharging, grows substantially, and the battery becomes impossible to charge, so that the capacity of the lead acid storage battery is prematurely reduced. In the reverse case in which the lead acid storage battery is in an overcharged state for a long period of time, the service life of the battery is prematurely reduced because the lead alloy serving as the positive collector corrodes and the water content in the electrolyte is reduced by electrolysis.

Wind power generation apparatuses and solar power generation apparatuses can be designed to have a service life of 17 to 20 years. Converters and inverters can also be provided with substantially the same durability, but no matter how long the service life of the generation apparatus, the converters and inverters is extended, the lead acid storage battery must be frequently replaced when the service life of a lead acid storage battery is reduced to about five years. Therefore, the overall cost of a system is increased as a result.

SUMMARY OF THE INVENTION

An object of the present invention is to provide an optimal method for operating a lead acid storage battery to extend the service life of a lead acid storage battery that is charged by a power generation device in order to compensate for fluctuations in the output of a solar power generation apparatus, a wind power generation apparatus, or other natural energy power generation device.

Another object of the present invention is to provide a storage device for power generation equipment that uses natural energy and that is capable of extending the service life of a lead acid storage battery.

The following aspects are disclosed in the present application in order to achieve the objects described above.

A first aspect of the present invention is a method for operating a lead acid storage battery charged by a solar cell, a wind power generator, or another natural energy power generation device and discharged to an external circuit, the lead acid storage battery being connected to the power generation device in order to compensate for fluctuations in the amount of power generated by the power generation device. In the operating method of the present invention, the state of charge of the lead acid storage battery is maintained in a range of 30 to 90% where a fully charged state of the lead acid storage battery is 100%; and the lead acid storage battery is charged and discharged while the battery voltage is kept in a specified range of 1.80 to 2.42 V per cell.

A second aspect of the present invention is the method according to the first aspect, wherein the lead acid storage battery is operated by charging and discharging the lead acid storage battery while keeping the battery voltage in the specified range when 25° C. is taken as a reference temperature and an ambient temperature of the lead acid storage battery is the reference temperature; charging and discharging the lead acid storage battery when the ambient temperature has risen above the reference temperature by carrying out a correction for reducing an upper limit value and a lower limit value of the specified range by a correction amount selected in a range of 4 mV/° C. to 6 mV/° C. per cell in accordance with an amount by which the ambient temperature has increased over the reference temperature, whereby a corrected voltage range is obtained; and keeping the battery voltage in the corrected voltage range; and charging and discharging the lead acid storage battery when the ambient temperature has fallen below the reference temperature by carrying out a correction for increasing the upper limit value and the lower limit value of the specified range by a correction amount selected in a range of 4 mV/° C. to 6 mV/° C. per cell in accordance with an amount by which the ambient reference temperature has decreased from the reference temperature, whereby a corrected voltage range is obtained; and keeping the battery voltage in the corrected voltage range.

A third aspect of the present invention is the method according to the first or second aspect, wherein the maximum discharge current of the lead acid storage battery during operation is maintained at 0.4 CA or less where C is the rated capacity [Ah] of the lead acid storage battery.

A fourth aspect of the present invention is the method according to the first, second, or third aspect, wherein the maximum charge current of the lead acid storage battery during operation is maintained at 0.3 CA or less where C is the rated capacity [Ah] of the lead acid storage battery.

A fifth aspect of the present invention is the method according to any of the first to fourth aspects, wherein operation is stopped each time a set interval has elapsed after the operation of lead acid storage battery has been started, and refresh charging is carried out for uniformly charging the lead acid storage battery to a fully charged state.

A sixth aspect of the present invention is the method according to any of the first to fifth aspects, wherein the state of charge of the lead acid storage battery during operation is computed by accumulating an amount of charged electricity and an amount of discharged electricity (Ah).

A seventh aspect of the present invention is a storage device provided with a lead acid storage battery charged by a natural energy power generation device and discharged to an external circuit, the lead acid storage battery being connected to the power generation device in order to compensate for fluctuations in an output generated by the power generation device, and in the present invention the storage device comprises a charge/discharge control device for controlling charging and discharging of the lead acid storage battery so that the lead acid storage battery is operated using the operating method described in any of the first through sixth aspects.

In accordance with the present invention, charging and discharging of the lead acid storage battery during operation are performed while the SOC is kept in a range of 30 to 90%, and the voltage of the lead acid storage battery is held in a range of 1.80 to 2.42 V per cell, making it possible to operate the lead acid storage battery in an insufficiently charged state, and greatly extend its service life.

In the present invention, a reference temperature is set to 25° C., and charging and discharging of the lead acid storage battery is carried out while the battery voltage is kept in a specified range (1.80 to 2.42 V/cell) when the ambient temperature of the lead acid storage battery is at the reference temperature. When the ambient temperature has increased or decreased relative to the reference temperature (25° C.), the upper limit value and the lower limit value of the specified range is increased or reduced by a correction amount selected in the range of 4 mV/° C. to 6 mV/° C. per cell in accordance with the increase or decrease in the ambient temperature from the reference temperature to obtain a corrected voltage range. It is possible to prevent the lead acid storage battery from becoming overcharged when the ambient temperature is high, to suppress accelerated corrosion of the positive grid and loss of electrolyte, and to extend service life in the case that the lead acid storage battery is charged and discharged in a state in which the battery voltage is kept in the corrected voltage range. In other words, charging efficiency is good even when the voltage is low at high temperatures. Therefore, the lead acid storage battery can be prevented from entering an overcharged state by carrying out operation so that the range of the battery voltage is shifted to a lower range. Conversely, since the charging efficiency is very poor at low temperatures, the occurrence of sulfation due to insufficient charging can be minimized by correcting the battery voltage during operation to account for temperature and shift the range of the battery voltage to a higher range.

Furthermore, according to the present invention, the maximum discharge current of the lead acid storage battery during operation is kept at 0.4 CA or less, and/or the maximum charge current of the lead acid storage battery during operation is kept at 0.3 CA or less, whereby the battery can be used while the Joule heat produced by the charge and discharge current is reduced, and the service life of a lead acid storage battery can be extended by minimizing, to the extent possible, any increase in temperature inside the lead acid storage battery.

According to the present invention, an effect can also be obtained in that it is possible to reduce the melting of a lead or resin which composes a container when heat is concentrated in conductive members other than the plates (e.g., poles, terminals, and straps) by limiting the charge and discharge current.

Furthermore, in accordance with the present invention, it is possible to obtain an effect in which the system control can be readily carried out in order to operate a battery so as to extend service life without increasing the complexity of the battery structure, because instantaneous fluctuations in the voltage can be reduced by limiting the charge and discharge current, and the battery voltage can be prevented from departing from a range in which the lead acid storage battery can be safely used.

In the present invention, it is possible to handle random changes in the amount of power generated by a wind power generation apparatus, a solar power generation apparatus, or another natural energy power generation device because the SOC of the lead acid storage battery can be constantly ascertained; and the amount of electricity that is allowed to be instantaneously charged and the amount of electricity that can be discharged can be predicted in the case that the SOC of the lead acid storage battery is computed by accumulating the amounts of electricity charged and discharged.

BRIEF DESCRIPTION OF THE DRAWINGS

FIG. 1 is a cross-sectional view of a grid;

DETAILED DESCRIPTION OF THE PREFERRED EMBODIMENTS

Figure 2:
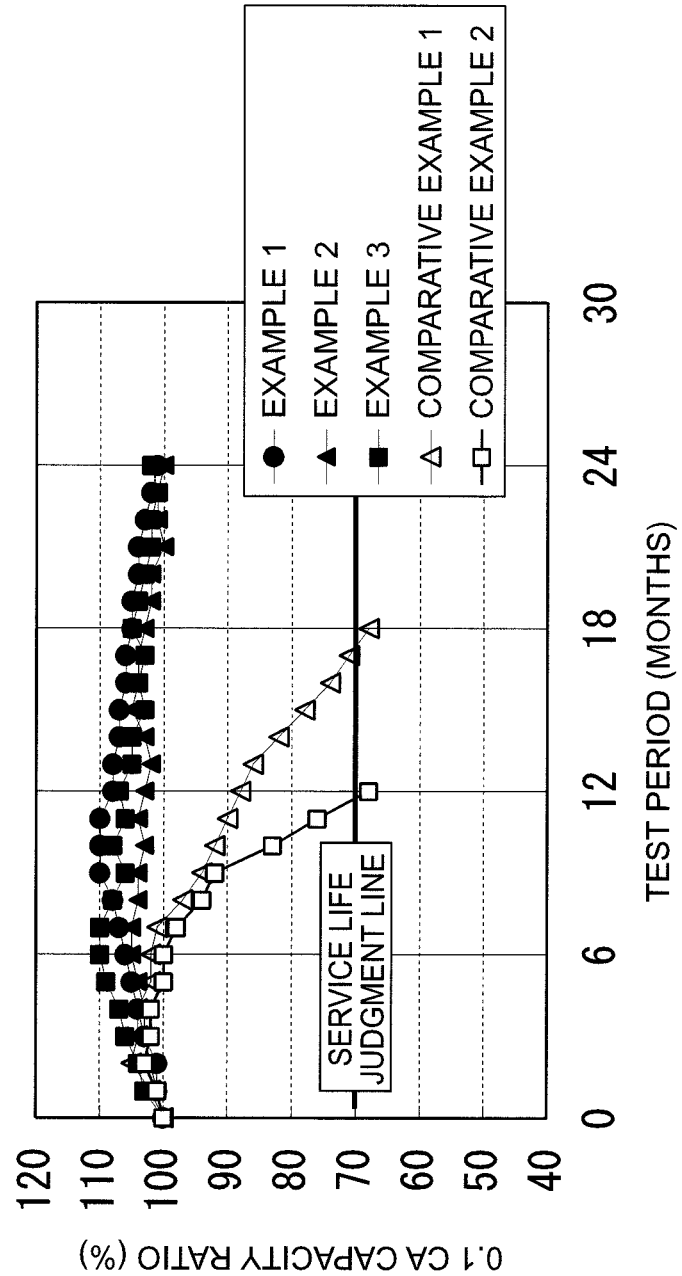
FIG. 2 is a graph showing the results of fluctuation suppression testing carried out for working examples 1 to 3 and comparative examples 1 and 2.

The solar power generation apparatus and wind power generation apparatus described below are typical natural energy power generation devices for charging a lead acid storage battery operated by the method of operation of the present invention.

<Solar Power Generation Apparatus>

In the present specification, the term "solar power generation apparatus" refers to a power generation apparatus that uses power generation elements for generating power using sunlight as an energy source. A solar cell is a specific example of a power generation element for generating power using sunlight as an energy source.

A solar cell is a power generation element for converting light energy directly to power using the photovoltaic effect. The solar cell may be one in which a p-type semiconductor and an n-type semiconductor are joined together in a p-n junction-type solar cell; a dye-sensitized solar cell for exciting electrons in a dye adsorbed on titanium dioxide; or the like.

<Wind Power Generation Apparatus>

In the present embodiment, the term "wind power generation apparatus" refers to a power generation apparatus that uses wind power as an energy source. A typical example of a wind power generation apparatus is a wind power generator that drives a generator using a turbine.

In the present invention, in the case that a wind power generator is used as the natural energy power generation device, the type of turbine in not particularly limited, and it is also possible to use a lift-based horizontal axis wind turbine, a drag-based horizontal axis wind turbine, a lift-based vertical axis wind turbine, a drag-based vertical axis wind turbine, or another suitably designed turbine. Examples of a lift-based horizontal axis wind turbine that may be used include propeller turbines and ribbon-based turbines. Examples of a drag-based horizontal axis wind turbine that may be used include sail wing turbines, classic Dutch turbines, multi-vane wind turbines, and pinwheel wind turbines. Examples of a lift-based vertical axis wind turbine that may be used include a Darrius wind turbine and a Giromill wind turbine. Examples of a drag-based vertical axis wind turbine that may be used include a Savonius wind turbine, a cross-flow wind turbine, an S-shaped wind turbine, and a paddle wind turbine.

Wind power generators that can be used as the natural energy power generation device are not limited to wind power generators that use turbines, it also being possible to obtain power by, i.e., arranging piezoelectric elements on vibration plates that vibrate by wind contact.

The solar power generation apparatus described above generates power in daylight when there is a certain amount of sunlight, and the amount of generated power varies depending on time, weather, and region. The amount of power generated by the wind power generation apparatus varies depending on the strength of the wind.

The power generation device for charging a lead acid storage battery operated by the method of the present invention is not limited to a solar power generation apparatus and a wind power generation apparatus, it also being possible to, i.e., use devices that make use of tidal and wave forces.

As described above, the power quality of the transmission grid is greatly compromised when a natural energy power generation device is directly linked to the transmission grid because of irregular fluctuation in the amount of power generated by the natural energy power generation device, which uses a solar power generation apparatus or a wind power generation apparatus as power generation elements. Therefore, in the case that the natural energy power generation device is linked to the transmission grid, a storage device must be provided for storing power generated by the power generator in a secondary battery in order to compensate for fluctuations in the output of the power generation device and to supply stable power from the storage battery to the transmission grid. In the present invention, a lead acid storage battery is used as the secondary battery provided to the storage device.

<Lead Acid Storage Battery>

The lead acid storage battery operated by the operating method of the present invention has a structure in which a plate carrying an active material on a lead or lead alloy substrate is immersed in an electrolyte. A tubular plate, pasted plate, or Tudor-type plate or the like may be used, but a pasted plate is preferred in that manufacturability is good and the plate surface area can be readily increased.

The substrate of the plate is referred to as a grid. A grid may be manufactured using gravity die casting (GDC), continuous casting, expanding, punching, or the like, but the grid used as the substrate of the plate of the lead acid storage battery operated using the operating method of the present invention is preferably manufactured using gravity die casting. This is due to the fact that a grid manufactured by gravity die casting theoretically does not have a limit to the thickness of the grid that can be cast and collection characteristics and corrosion resistance are excellent.

In gravity die casting, a material metal (alloy) for forming a grid is melted, the melted metal (alloy) is poured by gravity into a heat-resistance metal mold and cast. In accordance with this casting method, a grid having excellent collection characteristics and corrosion resistance can be manufactured at high speed with good efficiency.

The grid material may be an alloy containing lead as the main material to which tin, calcium, antimony, or the like has been added. Particularly preferable as the grid material is an alloy in which tin and calcium have been added to lead. The ratio of self-discharge can be reduced when calcium is added to lead. When calcium is added to lead, there is a problem in that the grid strands readily corrode, but grid strand corrosion can be reduced by adding tin together with calcium to the lead.

In a pasted plate, an active material in the form of a paste must be carried on the grid, and this process can be carried out by extruding an active material in the form of paste under pressure onto the grid, and then using a roller to further press the active material between strands of the grid.

In this case, the active material pressed between the grid strands from one surface of the grid must be brought around to the other surface of the grid to completely cover the grid with the active material. In order to achieve this goal, rather than using equal size grid strands, as shown in FIG. 1(*a*), the grid strands that form the grid preferably have a structure in which a thick strand 1 and a narrow strand 2 are used in combination as in FIG. 1(*b*), where one or more narrow strands 2 are arranged between thick strands 1. When a grid having such a structure is used, the active material pressed between the grid strands from one surface of the grid readily moves from the portions of the narrow strands 2 around to the reverse portions of the thick strands 1. Therefore, the entire grid structure can be covered with active material, and exposed areas of the grid can be avoided.

In a lead acid storage battery operated by the operating method of the present invention, the active material of the plate is not particularly limited, but is preferably made by kneading together water, sulfuric acid, a lead powder containing lead monoxide, or the like. Cut fiber, carbon powder, lignin, barium sulfate, red lead, and the like may be added to the active material in accordance with the characteristics of the positive and negative plates.

The electrolyte is not particularly limited, but is preferably one in which dilute sulfuric acid is diluted with purified water, and mixing is performed to a concentration of about 30 mass %. The solution is adjusted to a suitable concentration with consideration given to the battery capacity, service life, and other factors; and then poured into a container. There are also cases in which magnesium sulfate, silica gel, or other additives are added to the electrolyte in which dilute sulfuric acid has been diluted with purified water in accordance with the characteristics of the battery.

<Lead Acid Storage Battery Operation>

In the present embodiment, a storage device obtained by combining a large number of the lead acid storage batteries described above is connected to a power generation device. Under predetermined conditions, charging of the lead acid storage batteries is carried out by output from the power generation device and discharge is carried out from the lead acid storage batteries to an external circuit, and the lead acid storage batteries are operated in a partial state of charge in order to compensate for fluctuations in the power generated by a natural energy power generation device.

The term "external circuit" is an ordinary power transmission grid, and may be a circuit connected to a load in a factory or other specific consumer.

The operating method of the present embodiment is described below. In the present embodiment, a fully charged state of the lead acid storage batteries is 100%, and charging and discharging of the lead acid storage batteries is carried out while the state of charge (SOC) of the lead acid storage batteries is kept in a range of 30 to 90% and the battery voltage is kept in a specified range of 1.80 to 2.42 V/cell when the lead acid storage batteries constituting the storage device are operated.

In a preferred mode of the present embodiment, the specified range of battery voltage is the above-stated range when the ambient temperature of the lead acid storage batteries is 25° C., and when the ambient temperature of the lead acid storage batteries is other than 25° C. the specified range of battery voltage is corrected in accordance with the ambient temperature.

In a preferred mode of the present embodiment, the maximum discharge current of the lead acid storage batteries during operation is kept at 0.4 CA (where C is the rated capacity [Ah] of the lead acid storage batteries) or less, and the maximum charge current of the lead acid storage batteries during operation is kept at 0.3 CA (where C is the rated capacity [Ah] of the lead acid storage batteries) or less.

Described in greater detail below are the SOC of the batteries, battery voltage, discharge current, charge current, and the like when the lead acid storage batteries are operated using the operating method of the present embodiment.

<SOC of the Lead Acid Storage Batteries>

The lead acid storage batteries operated using the method of the present invention preferably have a service life equal to or greater than the components using in the power generator.

In the present invention, the batteries are operated by charging and discharging while keeping the SOC in a range of 30 to 90% in order to extend the service life of the battery. In order to operate the lead acid storage battery while keeping the SOC within a range of 30 to 90%, first, the lead acid storage batteries are brought to a fully charged state (a state in which all of the positive active material is charged under positive capacity control). In this state, the SOC is defined to be 100%, and the lead acid storage batteries are discharged at a constant discharge current to reduce the SOC to a suitable value in a range of 30 to 90%. Using the SOC at this time as the initial value, the amount of charged electricity is thereafter added and the amount of discharged electricity is subtracted to accumulate the amounts of charged and discharged electricity, and successively compute the SOC from moment to moment. The charging and discharging of the lead acid storage batteries are controlled while the batteries are operated so that the computed SOC does not depart from the 30 to 90% range.

As used herein, "controlling the charging and discharging of the lead acid storage batteries so that the SOC does not depart from a range of 30 to 90%" means that discharging is forcibly stopped when the SOC is less than 30% and charging is forcibly stopped when the SOC has exceeded 90%, whereby the SOC can be kept in the 30 to 90% range.

When operated with the SOC outside of the above-stated range, the lead acid storage batteries are readily overcharged when the SOC exceeds 90%, corrosion of the positive grid is accelerated, water in the electrolyte is electrolyzed and reduced due to the high potential, and other factors increase the possibility that service life will be reduced.

In the range in which the SOC is less 30%, the lead acid storage batteries are readily overdischarged and readily insufficiently charged. Therefore, there is a possibility that the negative active material will undergo sulfation and that service life will be reduced.

In the description above, charging and discharging of the lead acid storage battery is controlled so that the SOC does not depart from the 30 to 90% range. In the present invention, the charging and discharging of the lead acid storage batteries can be controlled so that the SOC does not depart from the 30 to 90% range, and the charging and discharging of the lead acid storage batteries may be controlled so that the SOC is kept within an even narrower range set within the 30 to 90% range, e.g., a 30 to 60% range.

<Calculation of the SOC>

The value of the SOC is computed by successively adding and subtracting the amount of charged electricity and the amount of discharged electricity (Ah) in the lead acid storage batteries, using 100% as the state in which the capacity of the batteries is the rated capacity (the fully charged state). For example, a watt-hour meter for measuring the amounts of electricity charged and discharged is provided, the amount of electricity charged measured by the watt-hour meter during charging is added to the accumulated value of the amount of electricity computed immediately prior to the start of charging, and the amount of discharged electricity measured by the watt-hour meter during discharging is subtracted from the amount of electricity computed immediately prior to the start of discharging. The amounts of electricity charged and discharged are thereby successively accumulated, and the percentage (%) of the amount of electricity computed for individual moments in time relative to the rated capacity is taken as the SOC for the given moment of time.

For example, in the specific example of a lead acid storage battery having a rated capacity of 100 Ah, the fully charged capacity (SOC: 100%) is 100 Ah. When discharging is carried out for 6 minutes (0.1 hour) at 10 A, the discharged capacity is 1 Ah and the remaining capacity is 99 Ah. This is calculated to be an SOC of 99%.

The SOC of the lead acid storage batteries is computed in the manner described above, and carrying out such computation makes it possible to ascertain the SOC of the lead acid storage batteries at any moment, and the electric amount that is allowed to be instantaneously charged in the lead acid storage batteries and the electric amount that can be discharged from the lead acid storage batteries can be predicted according to the SOC thus obtained. Therefore, control for reducing fluctuations in the power supplied to an external circuit (e.g., the power transmission grid) connected to the power generation device can be precisely carried out in accordance with random variation in the power produced by the natural energy power generation device.

For example, when the amount of power generated by the natural energy power generation device is fluctuating in an increasing direction, fluctuations in the power supplied to the external circuit can be reduced by charging the lead acid storage batteries using the output of the power generation device; and when the amount of generated power is fluctuating in a decreasing direction, fluctuations in the power supplied to the external circuit can be reduced by stopping the charging of the lead acid storage batteries and then discharging from the lead acid storage batteries to the external circuit.

As described above, when the amount of discharged electricity of the lead acid storage batteries thus computed is successively accumulated, there is an effect in that the degradation state of the lead acid storage battery can be estimated to a certain degree and system control can be accurately programmed based on the estimation results by ascertaining the accumulated value of the discharge amount (overall discharge amount), which is an important element in terms of estimating the service life of the lead acid storage batteries. In other words, if the SOC can be ascertained, it can be determined how the system should control the lead acid storage batteries in relation to fluctuations in the power generation output estimated from the predicted state of the wind, and since the amounts of charged and discharged electricity can be accurately calculated, system control can be accurately carried out.

<Lead Acid Storage Battery Voltage>

According to the present invention, in order to further increase the service life of the lead acid storage batteries, a voltage range of 1.80 to 2.42 V/cell is taken as the specified range of the battery voltage (terminal voltage of the batteries), and the lead acid storage batteries are charged and discharged with the battery voltage kept in the specified range, whereby the lead acid storage batteries are operated.

In a preferred mode of the present invention, the reference temperature is set to 25° C., charging and discharging of the lead acid storage batteries is carried out while the battery voltage is kept in the specified range (a range of 1.80 to 2.42 V/cell) when the ambient temperature of the lead acid storage battery is at the reference temperature; and the upper limit value and the lower limit value of the specified range is reduced or increased in accordance with the increased amount or reduced amount from the ambient reference temperature. In other words, when the ambient temperature has risen above the reference temperature (25° C.), a correction is performed to reduce the upper limit value and the lower limit value of the specified range by a correction amount selected in the range of 4 mV/° C. to 6 mV/° C. per cell in accordance with the increase of the ambient temperature from the reference temperature to obtain the corrected voltage range, keep the battery voltage in the corrected voltage range, and carry out charging and discharging of the lead acid storage batteries. Also, when the ambient temperature has fallen to less than the reference temperature, a correction is carried out to increase the upper limit value and the lower limit value of the specified range by a correction amount selected in the range of 4 mV/° C. to 6 mV/° C. per cell in accordance with the reduction of the ambient temperature from the reference temperature to obtain the corrected voltage range, keep the battery voltage in the corrected voltage range, and carry out charging and discharging of the lead acid storage batteries.

For example, in the case that the upper limit value and the lower limit value of the specified range of the battery voltage is corrected by 5 mV/° C. when the ambient temperature has risen above the reference temperature, the corrected voltage range can be obtained by reducing the upper limit value and the lower limit value of the specified range of the battery voltage by 5 mV per cell for each 1° C. that the ambient temperature increases with the battery voltage at 25° C. set as a reference (reference operating voltage). Also, in the case that the upper limit value and the lower limit value of the specified range of the battery voltage is corrected by 5 mV/° C. when the ambient temperature has fallen below the reference temperature (25° C.), the corrected voltage range can be obtained by increasing the upper limit value and the lower limit value of the specified range of the battery voltage by 5 mV per cell for each 1° C. that the ambient temperature decreases. For example, if the ambient temperature is 40° C., 0.005×(40−25)=0.075 is subtracted from 1.80 and 2.42 delineating the upper and lower limits of the specified range, and the corrected voltage range is set to 1.725 to 2.345 V per cell.

The lead acid storage batteries are operated in a more suitable voltage range by setting the range of the battery voltage to be the corrected voltage range described above, the batteries being more readily affected by degradation due to temperature as the battery voltage departs further from the corrected voltage range.

A temperature sensor is disposed, e.g., in the vicinity of a portion of the lead acid storage batteries, the ambient temperature of the lead acid storage batteries is detected by converting signals obtained from the temperature sensor into a temperature numerical value, and the difference between the detected ambient temperature and the reference temperature (25° C.) in order to bring the voltage of the lead acid storage batteries into the corrected voltage range. The upper limit (2.42 V per cell) and the lower limit (1.80 V per cell) of the specified range are corrected on the basis of the difference between the ambient temperature and the reference temperature to obtain a corrected voltage range. However, an error in the range of ±1 mV/° C. is used as an allowable range in the correction for temperature value. For example, a range of 5 mV/° C.±1 mV/° C. is an allowable range in the case that the temperature is corrected by 5 mV/° C.

<Refresh Charging>

When the operating method of the present invention is implemented, equalizing charge (refresh charge) is preferably carried out until the lead acid storage batteries are fully charged in order to periodically refresh the lead acid storage batteries and reduce degradation of the lead acid storage batteries. Equalizing charge eliminates nonuniformity in the state of charge between batteries that is generated in the case that numerous secondary cells are used in a single assembly over a long period of time, and creates a uniform state of charge. In equalizing charge, charging is carried out using a constant current charge until the battery voltage of each battery reaches a predetermined voltage, and charging is thereafter carried out using a constant voltage charge for a fixed length of time.

The amount of charged electricity when uniform charging is carried out is added to the accumulated amount of charged electricity and discharged, and the accumulated value of the charge and discharge current from the end of the previous uniform charging is cleared after uniform charging has been completed. After uniform charging has ended, operation of the lead acid storage batteries is restarted after constant current discharge has been carried out and the SOC has been restored to a low state; i.e., approximately 60 to 65%.

In the present embodiment, "states during operation" refer to states in which the lead acid storage batteries are charged and discharged as required in order to link the power generation device to the transmission grid after random fluctuations in the amount of power generated by the solar power generation apparatus, the wind power generation apparatus, or another natural energy power generation device have been smoothed out to the extent possible. States not included in operation refer to states in which power generation has been stopped due to breakdown, inspection, or the like of the power generation device, or states in which the lead acid storage batteries are uniformly charged (constant current charging) in order to refresh the lead acid storage batteries.

<Maximum Discharge Current of the Lead Acid Storage Batteries>

The maximum discharge current during operation is preferably set to 0.4 CA or less. As used herein, "C" refers to the rated capacity (Ah; ampere hours) of the lead acid storage batteries and shows the electric amount that can be drawn out from a fully charged state (SOC; 100%) at a specific temperature, discharge current, and final voltage.

The maximum discharge current during operation is an important factor that affects the service life of the lead acid storage batteries, and temperature increase inside the lead acid storage batteries due to Joule heat can be suppressed by using a discharge current of 0.4 CA or less. Degradation due to the temperature of the lead acid storage batteries can thereby be kept to a minimum.

Limiting the maximum discharge current during operation to 0.4 CA or less can prevent the lead acid storage batteries from becoming readily overdischarged, and can reduce degradation of the service life of the lead acid storage batteries due to sulfation.

When the lead acid storage batteries are used continuously at a discharge current in excess of 0.4 CA, the plates in the lead acid storage batteries; the poles, straps, and other members; and the container made of resin; and the electrolyte increase in temperature. Not only do the positive plates undergo accelerated corrosion, but progressive degradation of various members also occurs.

In order to keep the maximum discharge current at 0.4 CA or less, the discharge voltage of the lead acid storage batteries is constantly ascertained, and control is carried out so as to reduce the discharge current when the discharge voltage (the battery voltage during discharge) has nearly reached a specified voltage (the battery voltage when a discharge current of 0.4 CA is flowing). Such control makes it possible to carry out operation that constantly keeps the maximum value of the discharge current of the batteries at 0.4 or less.

<Maximum Charge Current of the Lead Acid Storage Batteries>

The maximum charge current during operation is preferably set to 0.3 CA or less. The maximum charge current during operation affects the service life of the lead acid storage batteries. Rapid voltage increase in the lead acid storage batteries can be avoided, and temperature increase in the batteries overall and corrosion of the positive grid can be suppressed by carrying out charging with the maximum charge current set to 0.3 CA or less.

When charging is carried out using a charge current in excess of 0.3 CA, the temperature of the batteries increases rapidly, and not only is there accelerated corrosion of the positive grids, but the batteries are readily overcharged, loss of electrolyte is hastened due to electrolysis of water in the electrolyte, and the possibility of reaching the end of battery service life at an early stage is gradually increased.

In order to bring the maximum charge current to 0.3 CA or less, the charging voltage of the lead acid storage batteries is constantly measured, after which charging is carried out by a "constant voltage charging method" whereby the charge current is reduced when the battery voltage has reached a specified voltage (the charging voltage when a charge current of 0.3 CA flows). The current is thereby brought to 0.3 CA or less.

<Configuration of the Storage Device>

A charge control device for controlling the charging and discharging of the lead acid storage batteries so that the lead acid storage batteries are operated using the operating method of the present invention is provided to the storage device in which the lead acid storage batteries are operated by the operating method of the present invention. The charge control device can be configured using means for detecting the SOC, battery voltage, maximum discharge current, and maximum charge current; and means for controlling the charging and discharging of the lead acid storage batteries so that the detection values are kept within a target range in the operating method of the present invention. The method for controlling the charging and discharging of the lead acid storage batteries can be a known method.

In the case that the natural energy power generation device is linked to a transmission grid, the voltage value and voltage frequency fed from the power generation device to the transmission grid are naturally controlled so as to be equal to the voltage value and frequency of the transmission grid.

EXAMPLES

Examples of the present invention are described below in detail with reference to the accompanying drawings. First, the method for fabricating a valve regulated lead acid storage battery for operational testing is described below.

(Fabrication of a Positive Plate)

Tin (1.6 mass %) and calcium (0.08 mass %) were admixed with lead, and the entire mixture was melted into a lead alloy having 100 mass %. A grid having a length of 385 mm, a width of 140 mm, and a thickness of 5.8 mm was fabricated by gravity die casting. The cross-sectional shape of the strands was hexagonal for both the vertical and horizontal strands, and the height of the two strands was 3.2 mm and the width was 2.4 mm. Polyester fiber was admixed in the amount of 0.1 mass % with respect to the mass of the lead powder in which lead monoxide was the main component, water (12 mass %) and dilute sulfur acid (16 mass %) were subsequently added, and the re-kneaded active material paste was packed into the grid. After the active material was packed into the grid, the assembly was aged and dried to obtain a positive plate.

(Fabrication of a Negative Plate)

Tin (0.2 mass %) and calcium (0.1 mass %) were admixed with lead and the entire mixture was melted into a lead alloy having 100 mass %; and a grid having a length of 385 mm, a width of 140 mm, and a thickness of 3.0 mm was fabricated by gravity die casting. Here, the cross-sectional shape of the strands was hexagonal for both the vertical and horizontal strands, and the height of the two strands was 2.6 mm and the width was 1.8 mm. Lignin (0.2 mass %), barium sulfate (0.1 mass %), ordinary commercially available graphite or another carbon powder (0.2 mass %), and polyester fiber (0.1 mass %) were admixed in relation to the mass of the lead powder in which lead monoxide was the main component. Next, water (12 mass %) was added and the mixture was kneaded, after which dilute sulfuric acid (13 mass %) was subsequently added, and the re-kneaded active material paste was packed into the grid. After the active material was packed into the grid, the assembly was aged and dried to obtain a negative plate.

(Fabrication of Valve Regulated Lead Acid Storage Batteries)

The positive plates and negative plates described above were layered in alternating fashion one plate at a time with interjacently disposed separators. The same-polarity plates are linked by straps to fabricate a plate group composed 24 positive plates and 25 negative plates. The plate group was placed in a container, dilute sulfuric acid was poured, and formation was carried out to fabricate a valve regulated lead acid storage batteries of 2 V -1500 Ah.

(Operational Testing of the Valve Regulated Lead Acid storage battery)

An Operational Test was Carried Out at an Ambient Temperature of 25° C. using the lead acid storage batteries fabricated in the manner described above. A constant current was discharged at a discharge capacity of 0.1 CA (0.1 CA=150 A) at an ambient temperature of 25° C. each month to the battery used in the test. The test was ended when the battery voltage reached a discharge final voltage of 1.80 V per cell, and the amount of Ah was calculated from the discharge time to determine the discharge capacity. Changes in the measured discharge capacity are confirmed in this manner. The amount of degradation was judged by determining whether degradation had progressed until the battery reached its service life, using 70% capacity of the initial battery capacity as the service life judgment capacity, and using the state in which the battery capacity has reached 70% or less with respect to the initial capacity as the state in which service life has been reached.

Example 1

An operational test was carried out to ascertain the effect of the SOC. In this test, the SOC was 60%, the charge current was 0.2 CA, the discharge current was 0.2 CA, and charging for one second and discharging for one second was repeated without a rest interval. The test was carried out at a temperature of 25° C., the battery voltage was kept in a range of 1.80 V to 2.42 V per cell, and the degree of degradation was compared with other tests. In the present example, the SOC was kept at 60% throughout the interval of the operational test.

Example 2

An operational test was carried out to ascertain the effect of the SOC with the SOC at 30%, the charge current at 0.2 CA, and the discharge current at 0.2 CA. Charging for one second and discharging for one second was repeated without a rest interval. The test was carried out at a temperature of 25° C., the battery voltage was kept in a range of 1.80 V to 2.42 V per cell, and the degree of degradation was compared with other tests. In the present example, the SOC was kept at 30% throughout the interval of the operational test. The only difference between the present example and example 1 was the SOC.

Example 3

An operational test was carried out to ascertain the effect of the SOC with the SOC at 90%, the charge current at 0.2 CA, and the discharge current at 0.2 CA. Charging for one second and discharging for one second was repeated without a rest interval. The test was carried out at a temperature of 25° C., the battery voltage was kept in a range of 1.80 V to 2.42 V per cell, and the degree of degradation was compared with other tests. In the present example, the SOC was kept at 90% throughout the interval of the operational test. The only difference between the present example and example 1 was the SOC.

Comparative Example 1

An operational test was carried out to ascertain the effect of the SOC with the SOC at 20%, the charge current at 0.2 CA, and the discharge current at 0.2 CA. Charging for one second and discharging for one second was repeated without a rest interval. The test was carried out at a temperature of 25° C., the battery voltage was kept in a range of 1.80 V to 2.42 V per cell, and the degree of degradation was compared with other tests. In the present comparative example, the SOC was kept at 20% throughout the interval of the operational test. The only difference between the present comparative example and example 1 was the SOC.

Comparative Example 2

An operational test was carried out to ascertain the effect of the SOC with the SOC at 100%, the charge current at 0.2 CA, and the discharge current at 0.2 CA. Charging for one second and discharging for one second was repeated without a rest interval. The test was carried out at a temperature of 25° C., the battery voltage was kept in a range of 1.80 V to 2.42 V per cell, and the degree of degradation was compared with other tests. In the present comparative example, the SOC was kept at 100% throughout the interval of the operational test. The only difference between the present comparative example and example 1 was the SOC.

Reference Example 1

An operational test was carried out to ascertain the effect of voltage with the SOC at 30%, the charge current at 0.2 CA, and the discharge current at 0.2 CA. Charging for one second and discharging for one second was repeated without a rest interval. The test was carried out at a temperature of 25° C., the battery voltage was kept in a range of 1.70 V to 2.42 V per cell, and the degree of degradation was compared with other tests. In the present reference example, the SOC was kept at 30% throughout the interval of the operational test. The only difference between the present reference example and example 2 was voltage control.

Reference Example 2

An operational test was carried out to ascertain the effect of voltage with the SOC at 90%, the charge current at 0.2 CA, and the discharge current at 0.2 CA. Charging for one second and discharging for one second was repeated without a rest interval. The test was carried out at a temperature of 25° C., the battery voltage was kept in a range of 1.80 V to 2.52 V per cell, and the degree of degradation was compared with other tests. In the present reference example, the SOC was kept at 90% throughout the interval of the operational test. The only difference between the present reference example and example 3 was voltage control.

Example 4

An operational test was carried out to ascertain the effect of correction for temperature with the SOC at 90%, the charge current at 0.2 CA, and the discharge current at 0.2 CA. Charging for one second and discharging for one second was repeated without a rest interval. The test was carried out at a temperature of 40° C., voltage was controlled so as to keep the battery voltage in a range of 1.725 V to 2.345 V per cell (a correction for temperature of −5 mV/° C. per cell), and the degree of degradation was compared with other tests. In the present example, the SOC was kept at 90% throughout the interval of the operational test.

Example 5

An operational test was carried out to ascertain the effect of correction for temperature with the SOC at 90%, the charge current at 0.2 CA, and the discharge current at 0.2 CA. Charging for one second and discharging for one second was repeated without a rest interval. The test was carried out at a temperature of 40° C., voltage was controlled so as to keep the battery voltage in a range of 1.80 V to 2.42 V per cell (no correction for temperature), and the degree of degradation was compared with other tests. In the present example, the SOC was kept at 90% throughout the interval of the operational test. The only difference between the present example and example 4 was that the range of the battery voltage was not corrected for temperature.

Example 6

An operational test was carried out to ascertain the effect of correction for temperature with the SOC at 30%, the charge current at 0.2 CA, and the discharge current at 0.2 CA. Charging for one second and discharging for one second was repeated without a rest interval. The test was carried out at a temperature of 40° C., voltage was controlled so as to keep the battery voltage in a range of 1.725 V to 2.345 V per cell (a correction for temperature of −5 mV/° C. per cell for the upper and lower limit values of the voltage range), and the degree of degradation was compared with other tests. In the present example, the SOC was kept at 30% throughout the interval of the operational test.

Example 7

An operational test was carried out to ascertain the effect of correction for temperature with the SOC at 30%, the charge current at 0.2 CA, and the discharge current at 0.2 CA. Charging for one second and discharging for one second was repeated without a rest interval. The test was carried out at a temperature of 40° C., voltage was controlled so as to keep the battery voltage in a range of 1.65 V to 2.27 V per cell (a correction for temperature of −10 mV/° C. per cell for the upper and lower limit values of the voltage range), and the degree of degradation was compared with other tests. In the present example, the SOC was kept at 30% throughout the interval of the operational test. The present example differs from example 6 only in the voltage control based on correction for temperature.

Example 8

An operational test was carried out to ascertain the effect of the discharge current with the SOC at 60%, the charge current at 0.2 CA, and the discharge current at 0.4 CA. Charging for two seconds and discharging for one second was repeated without a rest interval. The test was carried out at a temperature of 25° C., voltage was controlled so as to keep the battery voltage in a range of 1.80 V to 2.42 V per cell, and the degree of degradation was compared with other tests. In the present example, the SOC was kept at 60% throughout the interval of the operational test.

Example 9

An operational test was carried out to ascertain the effect of the discharge current with the SOC at 60%, the charge current at 0.2 CA, and the discharge current at 0.6 CA. Charging for three seconds and discharging for three seconds was repeated without a rest interval. The test was carried out at a temperature of 25° C., voltage was controlled so as to keep the battery voltage in a range of 1.80 V to 2.42 V per cell, and the degree of degradation was compared with other tests. In the present example, the SOC was kept at 60% throughout the interval of the operational test. The present example differs from example 8 only in the discharge current and the charge time.

Example 10

An operational test was carried out to ascertain the effect of the charge current with the SOC at 60%, the charge current at 0.3 CA, and the discharge current at 0.2 CA. Charging for one second and discharging for 1.5 seconds was repeated without a rest interval. The test was carried out at a temperature of 25° C., voltage was controlled so as to keep the battery voltage in a range of 1.80 V to 2.42 V per cell, and the degree of degradation was compared with other tests. In the present example, the SOC was kept at 60% throughout the interval of the operational test.

Example 11

An operational test was carried out to ascertain the effect of the charge current with the SOC at 60%, the charge current at 0.4 CA, and the discharge current at 0.2 CA. Charging for one second and discharging for 2 seconds was repeated without a rest interval. The test was carried out at a temperature of 25° C., voltage was controlled so as to keep the battery voltage in a range of 1.80 V to 2.42 V per cell, and the degree of degradation was compared with other tests. In the present example, the SOC was kept at 60% throughout the interval of the operational test. The present example differs from example 10 only in the charge current and the discharge time.

The various conditions of examples 1 to 11, comparative examples 1 and 2, and reference examples 1 and 2 are summarized in Table 1 below.

TABLE 1

| Testing | SOC(%) | Charge Current (CA) | Discharge Current (CA) | Charge Time (Sec.) | Discharge Time (Sec.) | Testing Temp. (° C.) | Voltage Control (V/cell) |
|---|---|---|---|---|---|---|---|
| Example 1 | 60 | 0.2 | 0.2 | 1 | 1 | 25 | 1.80-2.42 |
| Example 2 | 30 | 0.2 | 0.2 | 1 | 1 | 25 | 1.80-2.42 |

TABLE 1-continued

| Testing | SOC(%) | Charge Current (CA) | Discharge Current (CA) | Charge Time (Sec.) | Discharge Time (Sec.) | Testing Temp. (° C.) | Voltage Control (V/cell) |
|---|---|---|---|---|---|---|---|
| Example 3 | 90 | 0.2 | 0.2 | 1 | 1 | 25 | 1.80-2.42 |
| Comparative Example 1 | 20 | 0.2 | 0.2 | 1 | 1 | 25 | 1.80-2.42 |
| Comparative Example 2 | 100 | 0.2 | 0.2 | 1 | 1 | 25 | 1.80-2.42 |
| Reference Example 1 | 30 | 0.2 | 0.2 | 1 | 1 | 25 | 1.70-2.42 |
| Reference Example 2 | 90 | 0.2 | 0.2 | 1 | 1 | 25 | 1.80-2.52 |
| Example 4 | 90 | 0.2 | 0.2 | 1 | 1 | 40 | 1.725-2.345 |
| Example 5 | 90 | 0.2 | 0.2 | 1 | 1 | 40 | 1.80-2.42 |
| Example 6 | 30 | 0.2 | 0.2 | 1 | 1 | 40 | 1.725-2.345 |
| Example 7 | 30 | 0.2 | 0.2 | 1 | 1 | 40 | 1.65-2.27 |
| Example 8 | 60 | 0.2 | 0.4 | 2 | 1 | 25 | 1.80-2.42 |
| Example 9 | 60 | 0.2 | 0.6 | 3 | 1 | 25 | 1.80-2.42 |
| Example 10 | 60 | 0.3 | 0.2 | 1 | 1.5 | 25 | 1.80-2.42 |
| Example 11 | 60 | 0.4 | 0.2 | 1 | 2 | 25 | 1.80-2.42 |

In the examples, comparative examples, and reference examples, accelerated service life testing was carried out by presuming 5000 cycles of repeated charging/discharging per day (about 17 seconds per cycle) in order to reduce fluctuations in the power supplied to a transmission grid, and setting the charge/discharge cycle in the tests to be sufficiently shorter than the presumed charge/discharge cycle.

In examples 1 to 7, comparative examples 1 and 2, and reference examples 1 and 2, a single charge/discharge is repeated in two seconds for 43200 cycles per day. This corresponds to an accelerated service life test of 43200/5000=8.6 times.

In examples 8 to 11, the charge/discharge cycle is longer than the examples noted above. Therefore, the acceleration factors of the accelerated service life tests are as follows.

Example 8: 28800/5000=5.7 times
Example 9: 21600/5000=4.3 times
Example 10: 34560/5000=6.9 times
Example 11: 28800/5000=5.7 times (Operational Test Results)
<Ascertaining the effect of the SOC: Examples 1 to 3 and comparative examples 1 and 2>

FIG. 2 shows the change in capacity of the 0.1 CA discharge test. In examples 1 to 3, the initial capacity was maintained for a test period of 24 months, but in comparative example 1, the service life was about 18 months. The battery was disassembled on having reached its service life, whereupon it was found that a large quantity of lead sulfate had accumulated on the negative plates, and that this caused the battery to reach the end of its service life. In other words, in comparative example 1, it was determined that the battery service life was reduced when a state of insufficient charge was continued over a long period of time. Also, in comparative example 2, the service life was about 12 months. The battery was disassembled on having reached its service life, whereupon it was found that corrosion had brought about severe elongation of the positive plates and that this caused the battery to reach the end of its service life. In other words, in comparative example 2, it was found that the battery service life is reduced when the voltage of the battery instantaneously increases, and the potential is such that the positive grid readily undergoes oxidation as a result of charging at 0.2 CA with the SOC kept at 100%.

It is apparent from the results described above that an operating method for extending the service life of a lead acid storage battery can be provided by keeping the SOC in a range of 30 to 90% as shown in the operational tests of examples 1 to 3.

<Ascertaining the Effect of Voltage: Examples 2 and 3, and reference examples 1 and 2>

Figure 3:
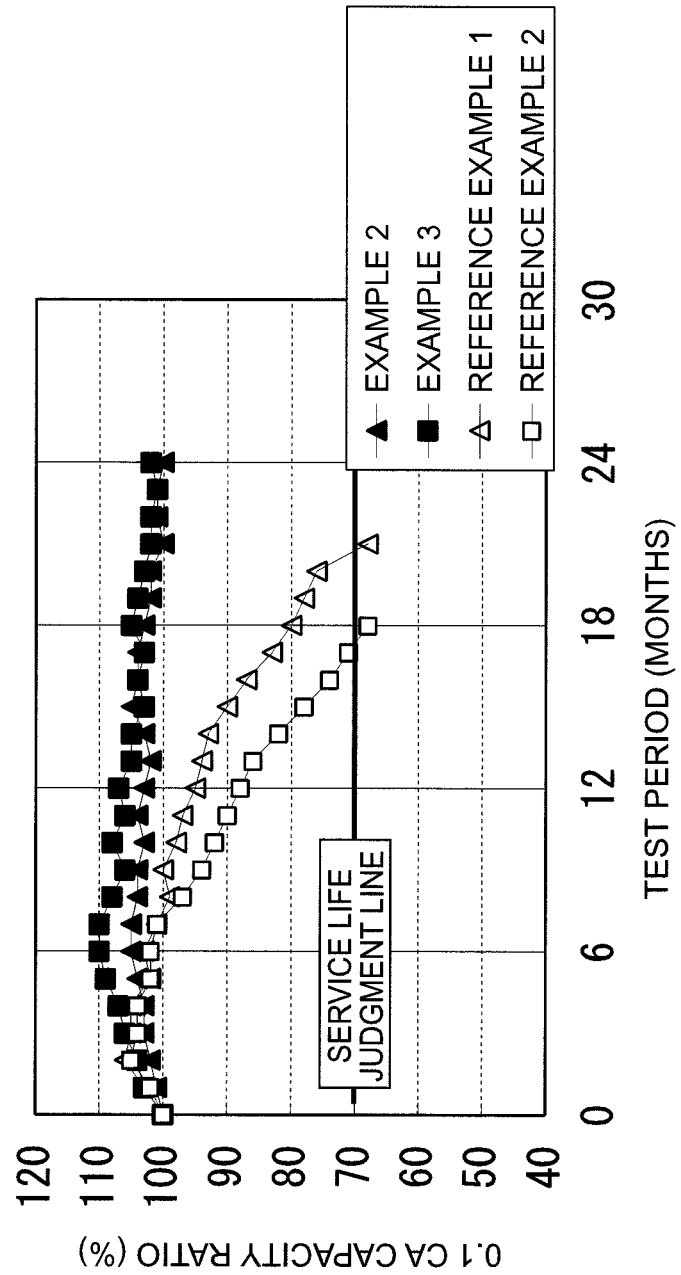
FIG. 3 is a graph showing the results of fluctuation suppression testing carried out for working examples 2 and 3 and reference examples 1 and 2.

FIG. 3 shows the change in capacity of the 0.1 CA discharge test. In examples 2 and 3, the initial capacity was maintained for a test period of 24 months, but in reference example 1, the service life was about 21 months. The battery was disassembled on having reached its service life, whereupon it was found that a large quantity of lead sulfate had accumulated on the negative plates and that this caused the battery to reach the end of its service life. In other words, in reference example 1, it was determined that battery service life was reduced when a state of insufficient charge was continued over a long period of time. Also, in comparative example 2, the service life was about 18 months. The battery was disassembled on having reached its service life, whereupon it was found that corrosion had brought about severe elongation of the positive plates and that this caused the battery to reach the end of its service life. In other words, in reference example 2, it was found that the battery service life is reduced when an overcharged state is continued for a long period of time.

It is apparent from the results described above, that an operating method for extending the service life of a lead acid storage battery can be provided by keeping the battery voltage in a range of 1.80 to 2.42 per cell at a testing temperature of 25° C. in the operational tests of examples 2 and 3.

<Ascertaining the Effect of Correction for Temperature: Examples 4 to 7>

Figure 4:
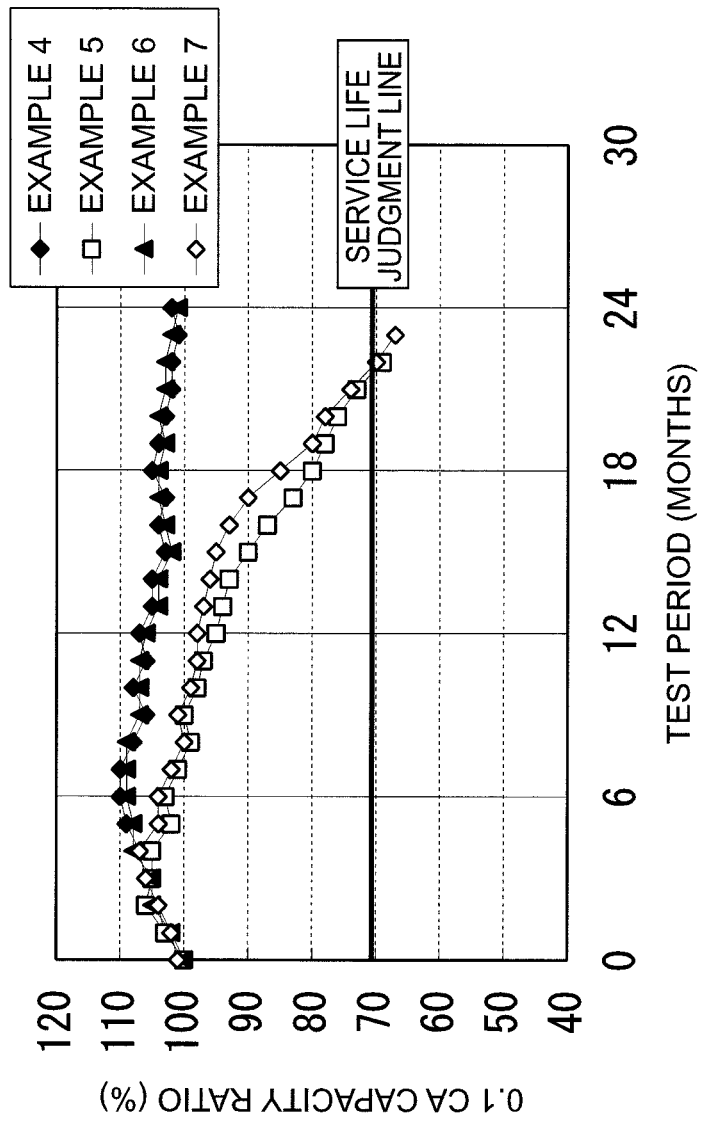
FIG. 4 is a graph showing the results of fluctuation suppression testing carried out for working examples 4 to 7.

FIG. 4 shows the change in capacity of the 0.1 CA discharge test. In example 4, the initial capacity was maintained for a test period of 24 months, but in example 5, the service life was about 22 months. The battery was disassembled on having reached its service life, whereupon it was found that chemical reactions had been activated due to the high-temperature environment, that corrosion had brought about severe elongation of the positive plates, and that this caused the battery to reach the end of its service life. In other words, in example 5, it was found that battery service life had been reduced because correction for temperature had not been made and an overcharge state had therefore continued.

In example 6, the initial capacity was maintained for a test period of 24 months, but in example 7, the service life was about 23 months. The battery was disassembled on having reached its service life, whereupon it was found that a large quantity of lead sulfate had accumulated on the negative plates and that this caused the battery to reach the end of its service life. In other words, in example 7, it was determined that battery service life was reduced when the value of the correction for temperature was increased and a state of insufficient charge had therefore continued.

It is apparent from the results described above, that an operating method for extending the service life of a lead acid storage battery can be provided by making suitable corrections for temperature to the control range of the battery voltage and thereby keep the voltage in a suitable range, as shown in examples 4 and 6.

<Ascertaining the effect of discharge current: Examples 1, 8, and 9>

Figure 5:
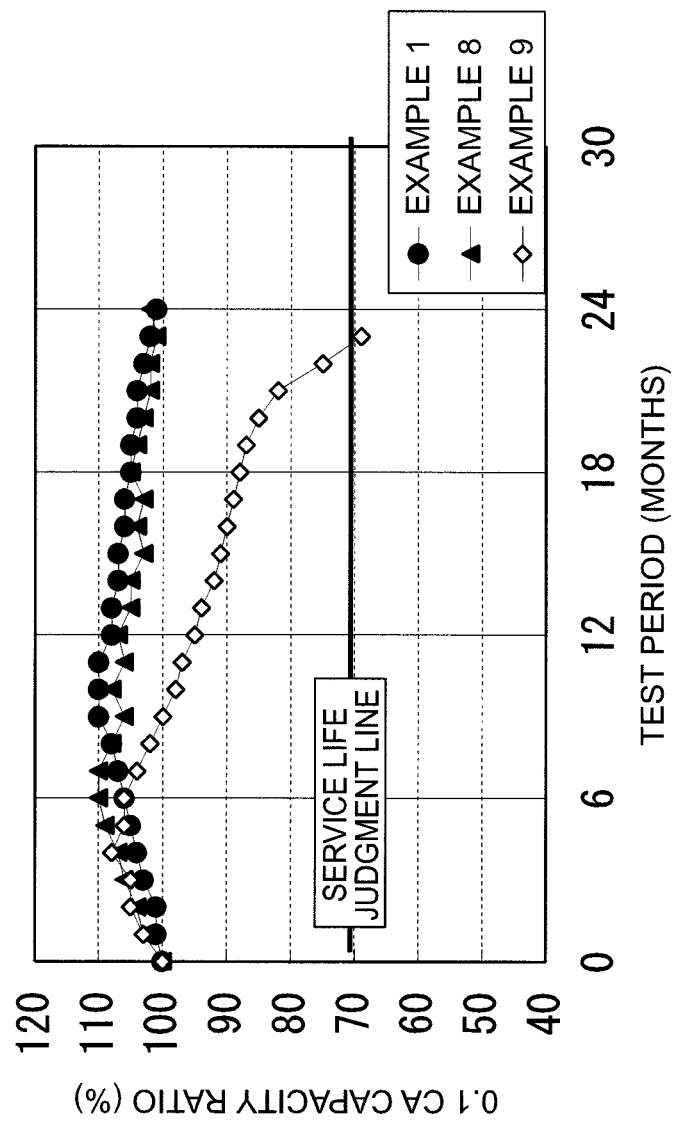
FIG. 5 is a graph showing the results of fluctuation suppression testing carried out for working examples 1, 8, and 9.

FIG. 5 shows the change in capacity of the 0.1 CA discharge test. In examples 1 and 8, the initial capacity was maintained for a test period of 24 months, but in example 9, the service life was about 23 months. The battery was disassembled on having reached its service life, whereupon it was found that a large quantity of lead sulfate had accumulated on the negative plates because the battery voltage had been reduced due to the increased discharge current, and that this caused the battery to reach the end of its service life. In other words, in example 9, it was determined that the battery service life was reduced when instantaneous deep discharging was repeated.

It is apparent from the results described above that an operating method for extending the service life of a lead acid storage battery can be provided by operating the battery so that the maximum discharge current is 0.4 CA or less to thereby keep the voltage in a suitable range, as shown in the operational tests of examples 1 and 8.

<Ascertaining the Effect of the Charge Current: Examples 1, 10, and 11>

Figure 6:
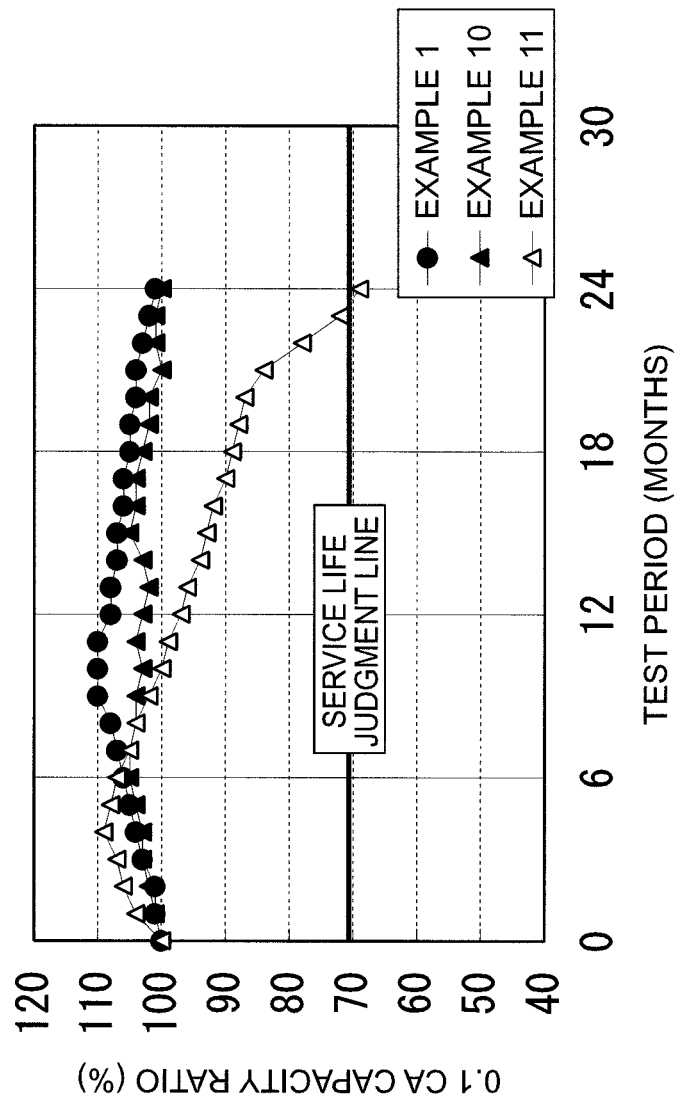
FIG. 6 is a graph showing the results of fluctuation suppression testing carried out for working examples 1, 10, and 11.

FIG. 6 shows the change in capacity of the 0.1 CA discharge test. In examples 1 and 10, the initial capacity was maintained for a test period of 24 months, but in example 11, the service life was about 24 months. The battery was disassembled on having reached its service life, whereupon it was found that a large quantity of lead sulfate had therefore accumulated on the negative plates because the battery voltage had been increased due to the increased charge current, that corrosion had brought about severe elongation of the positive plates, and that this caused the battery to reach the end of its service life. In other words, in example 11, it was determined that the battery service life was reduced when instantaneous overcharging was repeated.

It is apparent from the results described above, that an operating method for extending the service life of a lead acid storage battery can be provided by operating the battery so that the maximum discharge current is 0.3 CA or less to thereby keep the voltage in a suitable range, as shown in the operational tests of examples 1 and 10.

The invention claimed is:

1. A method for operating a lead acid storage battery charged by a natural energy power generation device and discharged to an external circuit, the lead acid storage battery being connected to the power generation device in order to compensate for fluctuations in the amount of power generated by the power generation device, said method for operating a lead acid storage battery including:

maintaining of a state of charge of the lead acid storage battery in a range of 30 to 90% where a fully charged state of the lead acid storage battery is 100%; and charging and discharging the lead acid storage battery while keeping the battery voltage in a specified range of 1.80 to 2.42 V per cell when 25° C. is taken as a reference temperature and an ambient temperature of the lead acid storage battery is the reference temperature;

charging and discharging the lead acid storage battery when the ambient temperature has risen above the reference temperature by carrying out a correction for reducing an upper limit value and a lower limit value of the specified range by a correction amount selected in a range of 4 mV/° C. to 6 mV/° C. per cell in accordance with an amount by which the ambient temperature has increased over the reference temperature, whereby a corrected voltage range is obtained; and keeping the battery voltage in the corrected voltage range; and charging and discharging the lead acid storage battery when the ambient temperature has fallen below the reference temperature by carrying out a correction for increasing the upper limit value and the lower limit value of the specified range by a correction amount selected in a range of 4 mV/° C. to 6 mV/° C. per cell in accordance with an amount by which the ambient reference temperature has decreased from the reference temperature, whereby a corrected voltage range is obtained; and keeping the battery voltage in the corrected voltage range;

wherein the maximum discharge current of the lead acid storage battery during operation is kept at 0.4 CA or less where C is the rated capacity of the lead acid storage battery, and wherein the maximum charge current of the lead acid storage battery during operation is kept at 0.3 CA or less where C is the rated capacity of the lead acid storage battery.

2. The method for operating a lead acid storage battery of claim 1, wherein operation is stopped each time a set interval has elapsed after the operation of lead acid storage battery has been started, and equalizing charge which is refresh charging is carried out until the lead acid storage battery is fully charged.

3. The method for operating a lead acid storage battery of claim 2, wherein the state of charge of the lead acid storage battery during operation is computed by accumulating an amount of charged electricity and an amount of discharged electricity (Ah).

4. A storage device for a natural energy power generation device, the storage device being provided with a lead acid storage battery charged by a natural energy power generation device and discharged to an external circuit, the lead acid storage battery being connected to the power generation device in order to compensate for fluctuations in an output of the power generation device, wherein the storage device comprises:

a charge/discharge control device for controlling charging and discharging of the lead acid storage battery so that the lead acid storage battery is operated using the operating method described in claim 3.

5. A storage device for a natural energy power generation device, the storage device being provided with a lead acid storage battery charged by a natural energy power generation device and discharged to an external circuit, the lead acid storage battery being connected to the power generation device in order to compensate for fluctuations in an output of the power generation device, wherein the storage device comprises:

a charge/discharge control device for controlling charging and discharging of the lead acid storage battery so that the lead acid storage battery is operated using the operating method described in claim 2.

6. A storage device for a natural energy power generation device, the storage device being provided with a lead acid storage battery charged by a natural energy power generation device and discharged to an external circuit, the lead acid storage battery being connected to the power generation device in order to compensate for fluctuations in an output of the power generation device, wherein the storage device comprises:
a charge/discharge control device for controlling charging and discharging of the lead acid storage battery so that the lead acid storage battery is operated using the operating method described in claim 1.

7. The method for operating a lead acid storage battery of claim 1, wherein the maximum charge current of the lead acid storage battery during operation is kept at 0.3 CA or less where C is the rated capacity of the lead acid storage battery.

8. A storage device for a natural energy power generation device, the storage device being provided with a lead acid storage battery charged by a natural energy power generation device and discharged to an external circuit, the lead acid storage battery being connected to the power generation device in order to compensate for fluctuations in an output of the power generation device, wherein the storage device comprises:
a charge/discharge control device for controlling charging and discharging of the lead acid storage battery so that the lead acid storage battery is operated using the operating method described in claim 7.

9. The method for operating a lead acid storage battery of claim 1, wherein operation is stopped each time a set interval has elapsed after the operation of lead acid storage battery has been started, and equalizing charge which is refresh charging is carried out until the lead acid storage battery is fully charged.

10. A storage device for a natural energy power generation device, the storage device being provided with a lead acid storage battery charged by a natural energy power generation device and discharged to an external circuit, the lead acid storage battery being connected to the power generation device in order to compensate for fluctuations in an output of the power generation device, wherein the storage device comprises:
a charge/discharge control device for controlling charging and discharging of the lead acid storage battery so that the lead acid storage battery is operated using the operating method described in claim 9.

11. The method for operating a lead acid storage battery of claim 1, wherein operation is stopped each time a set interval has elapsed after the operation of lead acid storage battery has been started, and equalizing charge which is refresh charging is carried out until the lead acid storage battery is fully charged.

12. The method for operating a lead acid storage battery of claim 1, wherein the state of charge of the lead acid storage battery during operation is computed by accumulating an amount of charged electricity and an amount of discharged electricity (Ah).

13. A storage device for a natural energy power generation device, the storage device being provided with a lead acid storage battery charged by a natural energy power generation device and discharged to an external circuit, the lead acid storage battery being connected to the power generation device in order to compensate for fluctuations in an output of the power generation device, wherein the storage device comprises:
a charge/discharge control device for controlling charging and discharging of the lead acid storage battery so that the lead acid storage battery is operated using the operating method described in claim 12.

14. The method for operating a lead acid storage battery of claim 1, wherein the state of charge of the lead acid storage battery during operation is computed by accumulating an amount of charged electricity and an amount of discharged electricity (Ah).

15. The method for operating a lead acid storage battery of claim 1, wherein the state of charge of the lead acid storage battery during operation is computed by accumulating an amount of charged electricity and an amount of discharged electricity (Ah).

16. A storage device for a natural energy power generation device, the storage device being provided with a lead acid storage battery charged by a natural energy power generation device and discharged to an external circuit, the lead acid storage battery being connected to the power generation device in order to compensate for fluctuations in an output of the power generation device, wherein the storage device comprises:
a charge/discharge control device for controlling charging and discharging of the lead acid storage battery so that the lead acid storage battery is operated using the operating method described in claim 1.

17. A storage device for a natural energy power generation device, the storage device being provided with a lead acid storage battery charged by a natural energy power generation device and discharged to an external circuit, the lead acid storage battery being connected to the power generation device in order to compensate for fluctuations in an output of the power generation device, wherein the storage device comprises:
a charge/discharge control device for controlling charging and discharging of the lead acid storage battery so that the lead acid storage battery is operated using the operating method described in claim 1.

* * * * *